July 14, 1936.  J. HANSEN  2,047,583
PROCESS OF MANUFACTURING ORNAMENTAL BLOCKS OR PANELS
Filed Sept. 20, 1935
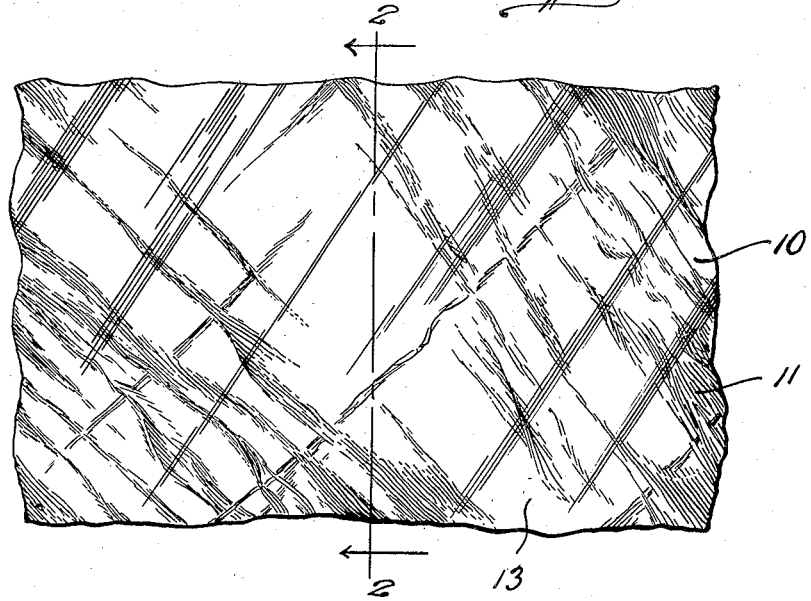
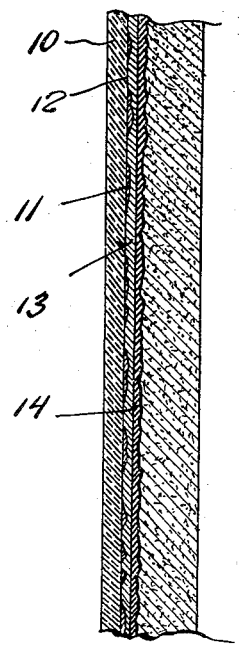
Julius Hansen,
INVENTOR.
BY J. Stanley Burch
ATTORNEY.

Patented July 14, 1936

2,047,583

UNITED STATES PATENT OFFICE 2,047,583

PROCESS OF MANUFACTURING ORNAMENTAL BLOCKS OR PANELS

Julius Hansen, Omaha, Nebr.

Application September 20, 1935, Serial No. 41,496

2 Claims. (Cl. 41—22)

The present invention provides a new method or process for producing panels or blocks of artificial marble, that is an article consisting of a piece of glass dealt with in a manner to present an appearance of marble, the invention being hereinafter more fully described and particularly pointed out in the claims.

In the drawing forming part of this application like numerals of reference indicate similar parts in the several views and wherein:

Figure 1 is a fragmentary face view of the article produced by the method.

Figure 2 is a sectional view on line 2—2 of Figure 1.

In carrying out the invention, a piece of ordinary glass 10 of any suitable size and shape is employed, and this glass is first thoroughly cleaned to relieve it of all grease and other foreign matter. The glass is preferably cleaned with ammonia and then polished with whiting. One side of the glass is then coated with a graining preparation 11 of any desired color.

The preparation used preferably consists of one part of whiting, two parts of white lead and colors as desired, mixed together, thinned with one part of linseed oil and a small portion of Japan drier, and one part turpentine. The preparation uses colors ground in Japan drier. This preparation is preferably applied by a thin brush, and let stand for approximately thirty minutes.

A sponge is then used, and is first dipped into pure turpentine, and subsequently squeezed to relieve it of any excessive amount of turpentine. In other words the sponge is properly dampened or moistened with the turpentine, and is then thoroughly worked in the graining preparation above referred to. The side of the glass being dealt with is then wiped with the sponge, in a manner whereby the turpentine will relieve the article of some of the first coating, along irregular lines, and thereby provide the article with clear spaces 12 as clearly illustrated in Figure 2. In order to fill these spaces with a similar graining preparation, but of a color or colors different from the first coating of the preparation, I employ another piece of sponge which is worked in a graining preparation of the desired color. The side of the glass is then wiped lightly with this second sponge, in a manner to fill the spaces 12 with the preparation from the second sponge so employed. The fine tips of the sponge will give the cross grain effect to the article so produced.

After the coatings of the graining preparations are substantially dry, two coats of paint, of any selected color or colors, and thinned with enough turpentine and Japan to make it dry hard, is then applied as indicated at 13 in Figure 2. Finally a backing for the article is provided with a coat of asphalt of rough texture indicated at 14.

While the article thus produced, may vary in size and configuration depending upon its particular application, it being of course understood that the article can be employed anywhere where panels and blocks are used, the invention is primarily intended for use as a wall facing and decoration.

For use in this connection, the wall is plastered, and the article is pressed into the plaster while in a plastic condition, the rough backing with suction being sufficient to hold the glass tightly until the plaster is thoroughly dry. The asphalt backing will prevent any dampness coming in contact with the paint, but care should be taken that the plaster is perfectly solid behind the panel to eliminate breakage thereof.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. A process of manufacturing ornamental blocks or panels consisting of coating one side of a piece of glass with a preparation of a desired color, wiping said side with a sponge dampened with the preparation and turpentine in a manner to provide the article with irregularly arranged clean spaces, by removing portions of the said coating, then coating said side with a similar preparation of different color or colors to fill said spaces and thereby afford a cross grain effect, and finally applying a coat of paint of selected colors after said preparation has sufficiently dried.

2. A process of manufacturing ornamental blocks or panels consisting of coating one side of a piece of glass with a preparation of a desired color, wiping said side with a sponge dampened with the preparation and turpentine in a manner to provide the article with irregularly arranged clean spaces, by removing portions of the said coating, then coating said side with a similar preparation of different color or colors to fill said spaces and thereby afford a cross grain effect, applying a coat of paint of selected colors after said preparation has sufficiently dried, and finally backing the whole with a coat of asphalt of rough texture.

JULIUS HANSEN.